US006795492B1

(12) United States Patent
Twitchell et al.

(10) Patent No.: US 6,795,492 B1
(45) Date of Patent: Sep. 21, 2004

(54) CONFIGURABLE EXCITER

(75) Inventors: Edwin Ray Twitchell, San Jose, CA (US); James W. Hauser, Liberty Township, OH (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/340,835

(22) Filed: Jun. 28, 1999

(51) Int. Cl.[7] .............................................. H04L 12/00
(52) U.S. Cl. ....................... 375/214; 375/229; 375/240; 375/295; 375/355; 375/356
(58) Field of Search ................................ 375/211, 214, 375/229, 240, 295, 355, 356

(56) References Cited

U.S. PATENT DOCUMENTS

| 4,425,664 A | | 1/1984 | Sherman et al. | |
|---|---|---|---|---|
| 5,559,808 A | * | 9/1996 | Kostreski et al. | ........... 370/517 |
| 5,892,879 A | | 4/1999 | Oshima | |
| 6,208,671 B1 | * | 3/2001 | Paulos et al. | ................. 341/61 |

FOREIGN PATENT DOCUMENTS

| EP | 0806852 A2 | 11/1997 |
|---|---|---|
| WO | WO 9716046 | 5/1997 |
| WO | WO 9909721 | 2/1999 |

OTHER PUBLICATIONS

A copy of International Search Report dated Mar. 7, 2001, mailing date Jul. 3, 2001.

* cited by examiner

Primary Examiner—Chi Pham
Assistant Examiner—Pankaj Kumar
(74) Attorney, Agent, or Firm—Tarolli, Sundheim, Covell & Tummino L.L.P.

(57) ABSTRACT

An exciter (10) is located along an information stream path of a transmission system (12). The exciter (10) supplies an information signal as a drive to an amplifying arrangement (14). A coder (28), programmable to be operative in any of several I/O formats, outputs the information signal that conveys data in a desired code arrangement. A filter (30), programmable to be operative in any of several I/O formats, confines the information signal energy to a predetermined channel bandwidth. A modulator (32), programmable to be operative in any of several I/O formats, modulating the information signal. A corrector/equalizer (34), programmable to be operative in any of several I/O formats, precorrects the modulated signal for errors induced in the transmission system. A controller (38) provides program control of the coder (28), the filter (30), the modulator (32), and the corrector/equalizer (34). Thus, the exciter (10) is configurable to handle several formats, such as MPEG2, DVIDEO, and AES3.

45 Claims, 2 Drawing Sheets

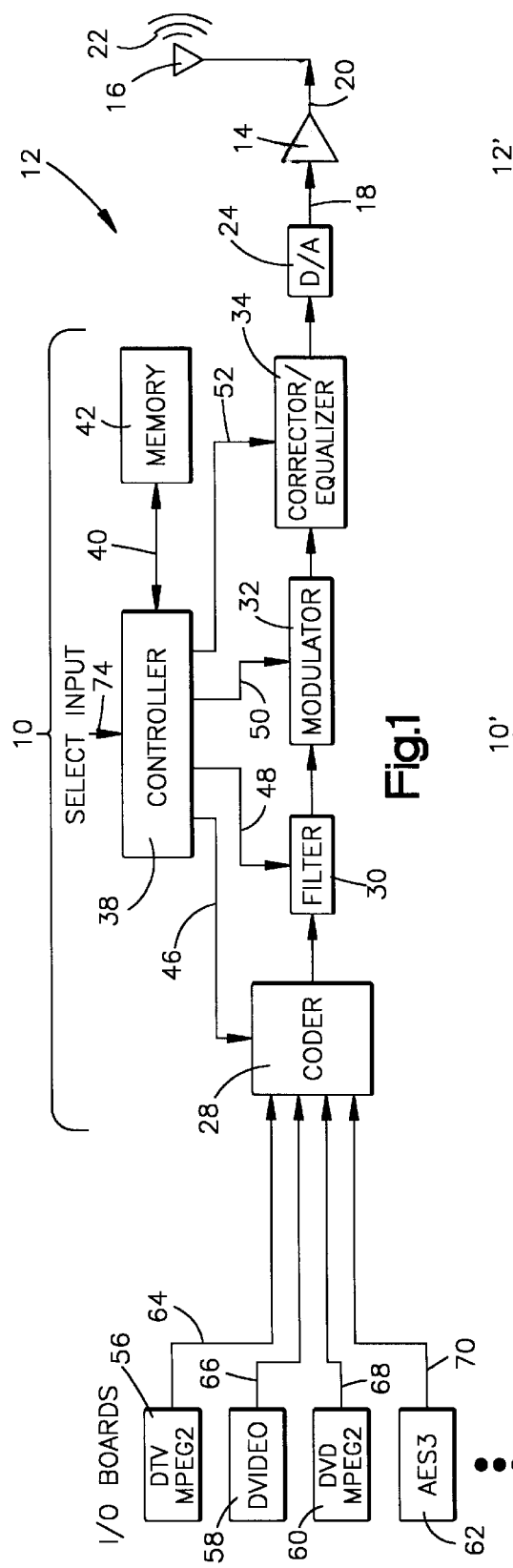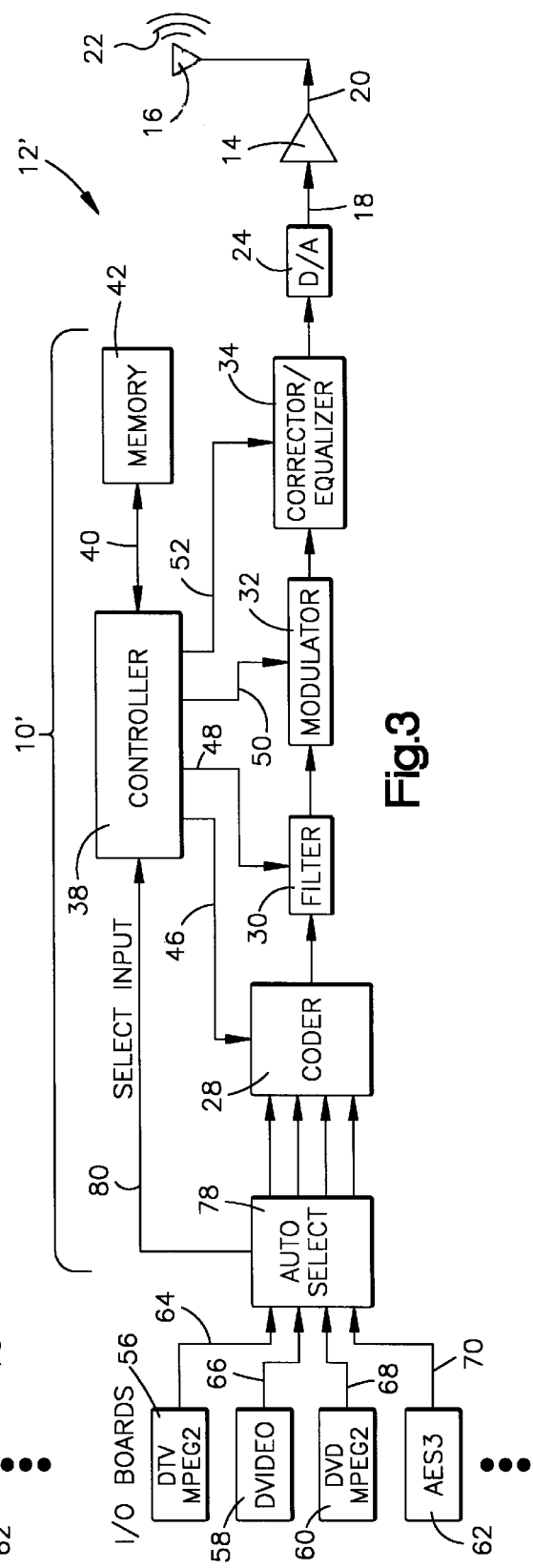

| TYPE | I/O FORMAT | CODING | FILTER | MODULATOR | CORRECTION/ EQUALIZATION |
|---|---|---|---|---|---|
| DTV | MPEG2 | TRANSPORT/ TRANSMISSION | NYQUIST (ROOT RAISED COSINE) | COMPLEX UPCONVERSION | LINEAR AND NON-LINEAR |
| NTSC | DVIDEO | NTSC/PAL FORMATTING | VSBF | COMPLEX UPCONVERSION | LINEAR AND NON-LINEAR |
| COFDM DVD | MPEG2 | TRANSPORT/ TRANSMISSION | FFT | FFT | LINEAR AND NON-LINEAR (FREQ. DOMAIN) |
| FM | AES3 | STEREO | LPF | DDS | PHASE ADJUSTMENT |

Fig.2

CONFIGURABLE EXCITER

TECHNICAL FIELD

The present invention relates to communication systems, and is particularly directed to an exciter useable for a plurality of communication formats.

BACKGROUND OF THE INVENTION

With the advent of digital television ("DTV") broadcasting, it is apparent that there will be at least two format standards utilized. Within the United States, the Federal Communication Commission ("FCC") has adopted an eight vestigial sideband ("8VSB") format. Elsewhere within the world, a coded orthogonal frequency division and multiplexing ("COFDM") format has been adopted.

Also, current analog television systems exist under either the National Television System Committee ("NTSC", U.S. and Japan) format or the Phase Alternation by Line ("PAL", elsewhere) format. Further, various other transmission formats exist.

Examples of such transmission formats include Frequency Modulation ("FM"), Amplitude Modulation ("AM"), Digital Audio Broadcast ("DAB"), Quadrature Amplitude Modulation ("QAM"), Code Division Multiple Access ("CDMA"), and Time Division Multiple Access ("TDMA").

Each of these different types of transmission use various types of modulation, occupy different bandwidths, and/or operate on different frequencies (channels). Digital systems that would be used within each of these types of transmission systems differ in their implementation details. For example, a comparison of the 8VSB and COFDM digital television formats indicate that there are differences relating to data rates, parity bits, block size and other parameters.

However, despite the differences, transmission systems of the various formats have certain characteristics that are common. From the standpoint of a manufacturer of broadcast transmission equipment, it would be beneficial to capitalize on the common aspects of the various types of transmission formats. This would allow a manufacturer to capitalize on economies of scale regarding manufacture of various transmission format systems.

SUMMARY OF THE INVENTION

In accordance with one aspect, the present invention provides an exciter, located along an information stream path of a transmission system, for supplying an information signal as a drive to an amplifying arrangement. Coder means outputs the information signal that conveys data and a desired code arrangement. Filter means restricts the energy of the signal to a predetermined channel bandwidth. Modulator means modulates the baseband information signal. Corrector/equalizer means pre-corrects the modulated signal for errors induced in the transmission system. At least two of the coder means, the filter means, the modulator means, and the corrector/equalizer means are programmable to be operative in any of several I/O formats. Controller means provides program control of at least two of the coder means, the filter means, the modulator means, and the corrector/equalizer means.

In accordance with another aspect, the present invention provides an exciter, located along an information stream path of a transmission system, for supplying an information signal as a drive to an amplifying arrangement. Filter means, programmable to be operative in any of several I/O formats, confines the signal energy to a predetermined channel bandwidth. Modulator means, programmable to be operative in any of several I/O formats, modulates the baseband signal. Corrector/equalizer means, programmable to be operative in any of several I/O formats, pre-corrects the modulated signal for errors induced in the transmission system. Controller means provides program control of the filter means, the modulator means, and the corrector/equalizer means.

In accordance with another aspect, the present invention provides an exciter, located along an information stream path of a transmission system, for supplying an information signal as a drive to an amplifying arrangement. Coder means, programmable to be operative in any of several I/O formats, outputs the information signal that conveys data and a desired code arrangement. Modulator means, programmable to be operative in any of several I/O formats, modulates the baseband signal. Corrector/equalizer means, programmable to be operative in any of several I/O formats, pre-corrects the modulated signal for errors induced in the transmission system. Controller means provides program control of the coder means, the modulator means, and the corrector/equalizer means.

In accordance with yet another aspect, the present invention provides an exciter, located along an information stream path of a transmission system, for supplying an information signal as a drive to an amplifying arrangement. Coder means, programmable to be operative in any of several I/O formats, outputs the information signal that conveys data and a desired code arrangement. Filter means, programmable to be operative in any of several I/O formats, confines the signal energy to a predetermined channel bandwidth. Corrector/equalizer means, programmable to be operative in any of several I/O formats, pre-corrects the modulated signal for errors induced in the transmission system. Controller means provides program control of the coder means, the filter means, and the corrector/equalizer means.

In accordance with still another aspect, the present invention provides an exciter, located along an information stream path of a transmission system, for supplying an information signal as a drive to an amplifying arrangement. Coder means, programmable to be operative in any of several I/O formats, outputs the information signal that conveys data and a desired code arrangement. Filter means, programmable to be operative in any of several I/O formats, confines the signal energy to a predetermined channel bandwidth. Modulator means, programmable to be operative in any of several I/O formats, modulates the baseband signal. Controller means provides program control of the coder means, the filter means, and the modulator means.

In accordance with still another aspect, the present invention provides an exciter, located along an information stream path of a transmission system, for supplying an information signal as a drive to an amplifying arrangement. Coder means, programmable to be operative in any of several I/O formats, outputs the information signal that conveys data and a desired code arrangement. Filter means, programmable to be operative in any of several I/O formats, confines the signal energy to a predetermined channel bandwidth. Modulator means, programmable to be operative in any of several I/O formats, modulates the baseband signal. Corrector/equalizer means, programmable to be operative in any of several I/O formats, pre-corrects the modulated signal for errors induced in the transmission system. Controller means provides program control of the coder means, the filter means, the modulator means, and the corrector/equalizer means.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a schematic illustration of a first embodiment of a system having an exciter in accordance with the present invention;

FIG. 2 is a chart illustrating several example types of transmission format with associated programming specifics; and FIG. 3 is a schematic illustration of a second embodiment in accordance with the present invention.

DESCRIPTION OF PREFERRED EMBODIMENTS

One representation of an exciter 10 in accordance with the present invention is schematically shown in FIG. 1 within a broadcast transmission system 12. The system 12 includes a power amplifier arrangement 14 and a broadcast transmission antenna 16. The power amplifier 14 amplifies an analog input 18 and outputs a stimulus signal 20 to the antenna 16, such that the antenna broadcasts a signal 22 having the desired strength characteristics. Located upstream of the power amplifier 14 is a digital-to-analog ("D/A") converter 24. The exciter 10 is located upstream of the D/A converter 24 and operates in the digital domain.

The exciter 10 includes a coder component 28 for processing data. The processing may include randomizing, interleaving, block coding (e.g., Reed Solomon encoding), and convolutional coding (e.g., Trellis encoding). Also, the processing may include symbol formatting, or other types of data encoding.

Located downstream of the coder 28 is a filter component 30 that confines the signal energy to a predetermined channel bandwidth. The filtering may include low-pass filtering, bandpass filtering, vestigial sideband filtering, and may be performed in the time domain or in the frequency domain. If frequency domain processing is used, a discrete Fourier transform is required.

A modulator component 32, located downstream of the filter 30, modulates the information signal onto a carrier frequency. This may include complex up-conversion or other processing (e.g., Fast Fourier Transform).

A corrector/equalizer component 34 is located downstream of the modulator 32 and upstream of the D/A converter 24. The corrector/equalizer 34 compensates for distortion of the information signal that occurs elsewhere in the system 12. For example the power amplifier 14 can distort the information signal. The compensation that occurs within the corrector/equalizer 34 may include correction of non-linear distortion, or equalization of linear distortion.

Each of the coder 28, the filter 30, the modulator 32, and the corrector/equalizer 34 is comprised of a Digital Signal Processor ("DSP") component or a programmable logic device("PLD", e.g., FPGA or EPLD) that is programmed to accomplish the associated function. Programming for each of the coder 28, the filter 30, the modulator 32, and the corrector/equalizer 34 is provided from a controller 38. Specifically, the controller 38 accesses 40 a memory 42 to receive stored program information. The controller 38 is operatively connected 46–52 to the coder 28, the filter 30, the modulator 32, and the corrector/equalizer 34, respectively, to provide program information to these four components.

It is to be appreciated that the coder 28, the filter 30, the modulator 32, and the corrector/equalizer 34 each have a certain degree of generic attributes. Specifically, the coder 28, the filter 30, the modulator 32, and the corrector/equalizer 34 are not predisposed (e.g., configured) or "earmarked" for a particular transmission (broadcast) format. The transmission format that is utilized within the four components of the exciter 10 is dependent upon the format for which the system 12 that includes the exciter will be utilized.

A plurality of input/output (I/O) boards 56–62 is connected to provide respective inputs 64–70 into the coder 28. I/O boards within the disclosed embodiment are hardwire boards that are provided for a DTV MPEG2 format, a DVIDEO format, a DVD MPEG2 format, an AES3 format. It is to be appreciated that different and/or additional I/O boards may be provided for different formats. Thus, it is to be appreciated that the coder 28, the filter 30, the modulator 32, and the corrector/equalizer 34 are programmable by the controller 38 to process the information signal coming from any of the several different format inputs. The programming is initiated via a select input 74 provided by an operator (not shown) of the system 12.

FIG. 2 is a chart illustrating example types of transmission systems and the associated different programming characteristics. For example, within a DTV transmission system, the I/O format is typically MPEG2. MPEG2 (Motion Picture Experts Group) is a variant of the MPEG video and audio compression algorithm and file format, optimized for broadcast quality video. MPEG-2 was designed to transmit interlaced images at 4 Mbps or higher for use in broadcast digital TV and DVD. MPEG-2 has been approved as International Standard IS-13818. Within the configurable exciter 10, the coder 28 is programmed for transport/transmission formatting, the filter 30 is programmed to perform a Nyquist filter function (e.g., a root-raised-cosine function). The modulator 32 is programmed to provide complex up-conversion, and the corrector/equalizer 34 is programmed to provide linear and non-linear correction.

To provide a transmission system for NTSC, the I/O format is DVIDEO. DVIDEO is simply the digital incarnation of the NTSC (National Television Systems Committee) format for video broadcast. In the NTSC format, a signal carries a 3.58 MHz signal with a phase that varies with the instantaneous hue of the transmitted color and an amplitude varying with the instantaneous saturation of the color. A signal in this format carries a 3.58 MHz signal with a phase that varies with the instantaneous hue of the transmitted color and an amplitude varying with the instantaneous saturation of the color. Within the configurable exciter 10, the coder 28 is programmed to provide NTSC/PAL video formatting. The filter 30 is programmed to provide Vestigial Sideband Filtering (VSBF). The modulator 32 is programmed to provide complex up-conversion, and the corrector/equalizer 34 is programmed to provide linear and non-linear correction.

To provide a transmission system for COFDM, the I/O format is MPEG2. The coder 28 is programmed to provide transport/transmission formatting. The filter 30 is programmed to provide a filtering function based upon the Fast Fourier Transformation that is programmed to occur within the modulator 32. The corrector/equalizer 34 is programmed to provide linear and non-linear correction, but within the frequency domain.

To provide a transmission system for FM, the I/O format is digital audio in the AES3 standard format. The AES3

(Audio Engineering Society) format is a well-accepted standard for the transmission of two channels of linearly represented digital audio data over a distance of 100 m in a professional audio environment. Equipment such as recorders, mixers, and signal processors in many installations worldwide conform to the AES3 standard. The coder 28 is programmed to perform a stereo generator function with FM stereo output. The filter 30 is programmed to provide a low-pass filtering. The modulator 32 is programmed for direct digital FM conversion using direct digital synthesis ("DDS").

FIG. 3 illustrates an embodiment that has a modification to permit automatic control. In other words, an operator need not select the type of system that the exciter is programmed to handle. In FIG. 3, the system is designated 12' and the exciter is designated 10' to indicate the modification from the embodiment of FIG. 1. Components of the embodiment of FIG. 3 that are identical to the corresponding components of the embodiment of FIG. 1 are identified by identical reference numbers.

In the embodiment of FIG. 3, an auto-select function portion 78 receives the inputs 64–70 from the various I/O boards 56–62. Dependent upon which I/O board (e.g., 56) is actively outputting its signal (e.g., 64), the auto-select function 78 provides a signal 80 to the controller 38. In response to the signal 80, the controller 38 accesses the memory 42 and provides programming to the coder 28, the filter 30, the modulator 32, and the corrector/equalizer 34, similar to the embodiment shown in FIG. 1.

Thus, it should be appreciated that a system in accordance with the present invention has a great deal of flexibility for its application use. The hardware specifics that are provided within a particular embodiment in accordance with the present invention are of course dictated by the various types of formats that are to be accommodated by the system.

Specifically, if the system is to be capable of handling DTV format signals, the digital signal processors must have sufficient capability to handle such high speed, high rate signals. For example, processing within a DTV modulator requires thousands of megaflops of processing power.

If the system is not intended to handle DTV signals, lesser processing capability would suffice. It should be noted that formats that require lesser processing capability could still be handled within such high-capacity arrangement, albeit it might appear to be "over-kill".

In addition, the input rates could be dictated by the types of format that requires the greatest amount. DTV and COFDM systems require approximately 20 Mb/s input rate. Thus, if the system is to be able to handle DTV and COFDM systems, the input rates of approximately Mb/s would be an upper range.

From a manufacturing standpoint, a single fixed platform could be manufactured, and then programmed for the desired application. From a customer's standpoint, modifications to the system can be accomplished merely upon a change of the programming that would be provided by the controller. Further, it should be appreciated that even within a single type of format (e.g., DTV), changes to the system can be accomplished merely by reprogramming. Thus, the present invention has several advantages over "hardwired" systems.

Although the preferred embodiments are described as having exciters with four programmable components, it is to be appreciated that different arrangements are possible. For example, it is contemplated that an exciter in accordance with the present invention would have a different number of components. It is also contemplated that an exciter in accordance with the present invention would have a number of programmable components that is less than the total number of components within the exciter.

From the above description of the invention, those skilled in the art will perceive improvements, changes and modifications. Such improvements, changes and modifications within the skill of the art are intended to be covered by the appended claims.

Having described the invention, the following is claimed:

1. An exciter, located along an information stream path of a transmission system, for supplying an information signal as a drive to an amplifying arrangement, said exciter comprising:
   coder means for outputting the information signal that conveys data in a desired code arrangement;
   filter means for restricting the information signal energy to a predetermined channel bandwidth;
   modulator means for modulating the information signal;
   corrector/equalizer means for pre-correcting the modulated signal for errors induced in the transmission system;
   wherein at least two of said coder means, said filter means, said modulator means, and said corrector/equalizer means being programmable to be operative in any of several I/O formats; and
   controller means for providing program control of said at least two of said coder means, said filter means, said modulator means, and said corrector/equalizer means.

2. An exciter as set forth in claim 1, wherein said at least two of said coder means, said filter means, said modulator means, and said corrector/equalizer means are said coder means and said filter means.

3. An exciter as set forth in claim 1, wherein said at least two of said coder means, said filter means, said modulator means, and said corrector/equalizer means are said coder means and said modulator means.

4. An exciter as set forth in claim 1, wherein said at least two of said coder means, said filter means, said modulator means, and said corrector/equalizer means are said coder means and said corrector/equalizer means.

5. An exciter as set forth in claim 1, wherein said at least two of said coder means, said filter means, said modulator means, and said corrector/equalizer means are said filter means and said modulator means.

6. An exciter as set forth in claim 1, wherein said at least two of said coder means, said filter means, said modulator means, and said corrector/equalizer means are said filter means and said corrector/equalizer means.

7. An exciter as set forth in claim 1, wherein said at least two of said coder means, said filter means, said modulator means, and said corrector/equalizer means are said modulator means and said corrector/equalizer means.

8. An exciter, located along an information stream path of a transmission system, for supplying an information signal as a drive to an amplifying arrangement, said exciter comprising:
   filter means, programmable to be operative in any of several I/O formats, for restricting the information signal energy to a predetermined channel bandwidth;
   modulator means, programmable to be operative in any of several I/O formats, for modulating the information signal;
   corrector/equalizer means, programmable to be operative in any of several I/O formats, for pre-correcting the modulated signal for errors induced in the transmission system;

controller means for providing program control of said filter means, said modulator means, and said corrector/equalizer means.

9. An exciter, located along an information stream path of a transmission system, for supplying an information signal as a drive to an amplifying arrangement, said exciter comprising:

coder means, programmable to be operative in any of several I/O formats, for outputting the information signal that conveys data in a desired code arrangement;

modulator means, programmable to be operative in any of several I/O formats, for modulating the information signal;

corrector/equalizer means, programmable to be operative in any of several I/O formats, for pre-correcting the modulated signal for errors induced in the transmission system; and controller means for providing program control of said coder means, said modulator means, and said corrector/equalizer means.

10. An exciter, located along an information stream path of a transmission system, for supplying an information signal as a drive to an amplifying arrangement, said exciter comprising:

coder means, programmable to be operative in any of several I/O formats, for outputting the information signal that conveys data in a desired code arrangement;

filter means, programmable to be operative in any of several I/O formats, for restricting the information signal energy to a predetermined channel bandwidth;

corrector/equalizer means, programmable to be opertive in any of several I/O formats, for pre-correcting the modulated signal for errors induced in the transmission system; and controller means for providing program control of said coder means, said filter means, and said modulator means.

11. An exciter, located along an information stream path of a transmission system, for supplying an information signal as a drive to an amplifying arrangement, said exciter comprising:

coder means, programmable to be operative in any of several I/O formats, for outputting the information signal that conveys data in a desired code arrangement;

filter means, programmable to be operative in any of several I/O formats, for restricting the information signal energy to a predetermined channel bandwidth;

modulator means, programmable to be operative in any of several I/O formats, for modulating the information signal; and controller means for providing program control of said coder means, said filter means, and said modulator means.

12. An exciter, located along an information stream path of a transmission system, for supplying an information signal as a drive to an amplifying arrangement, said exciter comprising:

coder means, programmable to be operative in any of several I/O formats, for outputting the information signal that conveys data in a desired code arrangement;

filter means, programmable to be operative in any of several I/O formats, for restricting the information signal energy to a predetermined channel bandwidth;

modulator means, programmable to be operative in any of several I/O formats, for modulating the information signal;

corrector/equalizer means, programmable to be operative in any of several I/O format, for pre-correcting the modulated signal for errors induced in the transmission system; and controller means for providing program control of said coder means, said filter means, said modulator means, and said corrector/equalizer means.

13. An exciter as set forth in claim 12, wherein said coder means, said filter means, said modulator means, and said corrector/equalizer means each includes a digital signal processor.

14. An exciter as set forth in claim 12, wherein said coder means, said filter means, said modulator means, and said corrector/equalizer means each includes a programmable logic device.

15. An exciter as set forth in claim 12, wherein said coder means, said filter means, said modulator means, and said corrector/equalizer means are each programmable to be operative for an MPEG2 format.

16. An exciter as set forth in claim 12, wherein said coder means, said filter means, said modulator means, and said corrector/equalizer means are each programmable to be operative for a digital NTSC I/O format.

17. An exciter as set forth in claim 12, wherein said coder means, said filter means, said modulator means, and said corrector/equalizer means are each programmable to be operative for an AES3 format.

18. An exciter as set forth in claim 12, wherein said coder means is configured to be connected to a plurality of inputs, said controller means including means for providing programming to said coder to process information from one of the plurality of inputs.

19. An exciter as set forth in claim 18, wherein said controller means includes means for receiving an input from an operator for selecting an I/O format, said controller means including means for using the selected I/O format to provide said programming control to said coder means, said filter means, said modulator means, and said corrector/equalizer means.

20. An exciter as set forth in claim 18, including means for automatically detecting which of the plurality of inputs is active and for providing a signal indicative of the active input to said controller means, said controller means including means for using the signal indicative of the active input to provide said programming control to said coder means, said filter means, said modulator means, and said corrector/equalizer means.

21. An exciter as set forth in claim 12, including memory means for storing program information, said controller means accessing said memory means to retrieve programming information for use in programming said coder means, said filter means, said modulator means, and said corrector/equalizer means.

22. An exciter as set forth in claim 12, wherein said controller means includes means for providing programming to each of said coder means, said filter means, said modulator means, and said corrector/equalizer means independently, and each of said coder means, said filter means, said modulator means, and said corrector/equalizer means is capable of having programming changed independent of programming of the other of said coder means, said filter means, said modulator means, and said corrector/equalizer means.

23. An exciter, located along an information stream path of a transmission system, for supplying an information signal as a drive to an amplifying arrangement, said exciter comprising:

coder means, programmable to be operative in any of several I/O formats and configured to be connected to a plurality of inputs, for outputting the information signal that conveys data in a desired code arrangement;

filter means, programmable to be operative in any of several I/O formats, for restricting the information signal energy to a predetermined channel bandwidth;

modulator means, programmable to be operative in any of several I/O formats, for modulating the information signal;

corrector/equalizer means, programmable to be operative in any of several I/O formats, for pre-correcting the modulated signal for errors induced in the-transmission system;

controller means for providing program control of sade coder means, said filter means, said modulator means, and said corrector/equalizer means; and detection means for automatically detecting which of the plurality of inputs is active and for providing a signal indicative of the active input to said controller means;

wherein said controller means includes means for providing programming to said coder to process-information from one of the plurality of inputs and means for using the signal indicative of the active input to provide said programming control to said coder means, said filter means, said modulator means, and said corrector/equalizer means.

24. An exciter, located along an information stream path of a transmission system, for supplying an information signal as a drive to an amplifying arrangement, said exciter comprising:

a coder that outputs the information signal that conveys data in a desired code arrangement;

a filter that restricts the information signal energy to a predetermined channel bandwidth;

a modulator that modulates the information signal;

a corrector/equalizer that pre-corrects the modulated signal for errors induced in the transmission system;

wherein at least two of said coders, said filter, said modulator, and said corrector/equalizer being programmable to be operative in any of several I/O formats; and controller means for providing program control of said at least two of said coder, said filter, said modulator, and said corrector/equalizer.

25. An exciter as set forth in claim 24, wherein said at least two of said coder, said filter, said modulator, and said corrector/equalizer are said coder and said filter.

26. An exciter as set forth in claim 24, wherein said at least two of said coder, said filter, said modulator, and said corrector/equalizer are said coder and said modulator.

27. An exciter as set forth in claim 24, wherein said at least two of said coder, said filter, said modulator, and said corrector/equalizer are said coder and said corrector/equalizer.

28. An exciter as set forth in claim 24, wherein said at least two of said coder, said filter, said modulator, and said corrector/equalizer are said filter and said modulator.

29. An exciter as set forth in claim 24, wherein said at least two of said coder, said filter, said modulator, and said corrector/equalizer are said filter and said corrector/equalizer.

30. An exciter as set forth in claim 25, wherein said at least two of said coder, said filter, said modulator, and said corrector/equalizer are said modulator and said corrector/equalizer.

31. An exciter, located along an information stream path of a transmission system, for supplying an information signal as a drive to an amplifying arrangement, said exciter comprising:

a filter, programmable to be operative in any of several I/O formats, that restricts the information signal energy to a predetermined channel bandwidth;

a modulator, programmable to be operative in any of several I/O formats, that modulates the information signal;

a corrector/equalizer, programmable to be operative in any of several I/O formats, that pre-corrects the modulated signal for errors induced in the transmission system;

a controller that provides program control of said filter, said modulator, and said corrector/equalizer.

32. An exciter, located along an information stream path of a transmission system, for supplying an information signal as a drive to an amplifying arrangement, said exciter comprising:

a coder, programmable to be operative in any of several I/O formats, that outputs the information signal that conveys data-in a desired code arrangement;

a modulator, programmable to be operative in any of several I/O formats, that modulates the information signal;

a corrector/equalizer, programmable to be operative in any of several I/O formats, that pre-corrects the modulated signal for errors induced in the transmission system; and a controller that provides program control of said coder, said modulator, and said corrector/equalizer.

33. An exciter, located along an information stream path of a transmission system, for supplying an information signal as a drive to an amplifying arrangement, said exciter comprising:

a coder, programmable to be operative in any of several I/O formats, that outputs the information signal that conveys data in a desired code arrangement;

a filter, programmable to be operative in any of several I/O formats, that restricts the information signal energy to a predetermined channel bandwidth;

a corrector/equalizer, programmable to be operative in any of several I/O formats, that pre-corrects the modulated signal for errors induced in the transmission system; and a controller that provides program control of said coder, said filter, and said corrector/equalizer.

34. An exciter, located along an information stream path of a transmission system, for supplying an information signal as a drive to an amplifying arrangement, said exciter comprising:

a coder, programmable to be operative in any of several I/O formats, that outputs the information signal that conveys data in a desired code arrangement;

a filter, programmable to be operative in any of several I/O formats, that restricts the information signal energy to a predetermined channel bandwidth;

a modulator, programmable to be operative in any of several I/O formats, that modulates the information signal; and a controller that provides program control of said coder, said filter, and said modulator.

35. An exciter, located along an information stream path of a transmission system, for supplying an information signal as a drive to an amplifying arrangement, said exciter comprising:

a coder, programmable to be operative in any of several I/O formats, that outputs the information signal that conveys data in a desired code arrangement;

a filter, programmable to be operative in any of several I/O formats, that restricts the information signal energy to a predetermined channel bandwidth;

a modulator, programmable to be operative in any of several I/O formats, that modulates the information signal;

a corrector/equalizer, programmable to be operative in any of several I/O formats, that pre-corrects the modulated signal for errors induced in the transmission system; and a controller for providing program control of said coder, said filter, said modulator, and said corrector/equalizer.

36. An exciter as set forth in claim 35, wherein said coder, said filter, said modulator, and said corrector/equalizer each include a digital signal processor.

37. An exciter as set forth in claim 35, wherein said coder, said filter, said modulator, and said corrector/equalizer each include a programmable logic device.

38. An exciter as set forth in claim 35, wherein said coder, said filter, said modulator, and said corrector/equalizer are each programmable to be operative for an MPEG2 format.

39. An exciter as set forth in claim 35, wherein said coder, said filter, said modulator, and said corrector/equalizer are each programmable to be operative for a digital NTSC format.

40. An exciter as set forth in claim 35, wherein said coder, said filter, said modulator, and said corrector/equalizer are each programmable to be operative for an AES3 format.

41. An exciter as set forth in claim 35, wherein said coder is configured to be connected to a plurality of inputs, said controller providing programming to said coder to process information from one of the plurality of inputs.

42. An exciter as set forth in claim 41, wherein said controller receives an input from an operator for selecting an I/O format and uses the selected I/O format to provide said programming control to said coder, said filter, said modulator, and said corrector/equalizer.

43. An exciter as set forth in claim 41, including a sensor that automatically detects which of the plurality of inputs is active and provides a signal indicative of the active input to said controller, which uses the signal indicative of the active input to provide said programming control to said coder, said filter, said modulators, and said corrector/equalizer.

44. An exciter as set forth in claim 35, including a memory for storing program information, said controller accessing said memory to retrieve programming information for use in programming said coder, said filter, said modulator, and said corrector/equalizer.

45. An exciter as set forth in claim 35 wherein said controller provides programming to each of said coder, said filter, said modulator, and said corrector/equalizer independently, and each of said coder, said filter, said modulator, and said corrector/equalizer is capable of having programming changed independent of programming of the other of said coder, said filter, said modulator, and said corrector/equalizer.

* * * * *

UNITED STATES PATENT AND TRADEMARK OFFICE
CERTIFICATE OF CORRECTION

PATENT NO.   : 6,795,492 B1
DATED        : September 21, 2004
INVENTOR(S)  : Edwin R. Twitchell and James W. Hauser It is certified that error appears in the above-identified patent and that said Letters Patent is hereby corrected as shown below:

Column 7,
Line 31, after "be" change "opertive" to -- operative --.
Line 36, after "said" change "modulator" to -- corrector/equalizer --.

Column 9,
Line 16, after "of" change "sade" to -- said --.

Signed and Sealed this

Twenty-second Day of February, 2005

JON W. DUDAS
*Director of the United States Patent and Trademark Office*